(12) United States Patent
Tenno

(10) Patent No.: US 10,411,325 B2
(45) Date of Patent: Sep. 10, 2019

(54) ANTENNA DEVICE, ANTENNA MODULE, AND COMMUNICATION TERMINAL APPARATUS

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 166 days.

(21) Appl. No.: 15/378,094

(22) Filed: Dec. 14, 2016

(65) Prior Publication Data

US 2017/0125883 A1    May 4, 2017

Related U.S. Application Data

(63) Continuation of application No. PCT/JP2015/066142, filed on Jun. 4, 2015.

(30) Foreign Application Priority Data

Jul. 2, 2014   (JP) .................................. 2014-136911

(51) Int. Cl.
*H01Q 1/22* (2006.01)
*H01Q 7/06* (2006.01)
(Continued)

(52) U.S. Cl.
CPC ..... *H01Q 1/2283* (2013.01); *G06K 19/07749* (2013.01); *H01Q 1/2216* (2013.01);
(Continued)

(58) Field of Classification Search
CPC .......... H01Q 1/2283; H01Q 7/06; H01Q 1/38; G06K 19/07749; G06K 19/07743; H04B 5/0081
See application file for complete search history.

(56) References Cited

U.S. PATENT DOCUMENTS

2009/0166434 A1* 7/2009 Taniguchi .......... G06K 19/0723
                                                      235/492
2010/0103058 A1* 4/2010 Kato ................ G06K 19/07749
                                                      343/702
(Continued)

FOREIGN PATENT DOCUMENTS

| JP | 2011-193245 A | 9/2011 |
| WO | 2009/081683 A1 | 7/2009 |
| WO | 2013/161608 A1 | 10/2013 |

OTHER PUBLICATIONS

Official Communication issued in corresponding International Application PCT/JP2015/066142, dated Jul. 14, 2015.

*Primary Examiner* — Ricardo I Magallanes
(74) *Attorney, Agent, or Firm* — Keating & Bennett, LLP

(57) ABSTRACT

An antenna device includes an antenna coil with first and second ends and an IC with at least first and second terminals. A closed loop including the antenna coil and the IC is defined by external terminals connected to a conductor pattern on a circuit board mounted to the circuit board. Accordingly, an antenna device and an antenna module that significantly reduce or prevent malfunctions before the antenna device is incorporated into an electronic apparatus, and a communication terminal apparatus including the antenna device or the antenna module, are provided.

20 Claims, 14 Drawing Sheets

(51) Int. Cl.
*H01Q 1/38* (2006.01)
*H04B 5/00* (2006.01)
*G06K 19/077* (2006.01)

(52) U.S. Cl.
CPC ............ *H01Q 1/2291* (2013.01); *H01Q 1/38* (2013.01); *H01Q 7/06* (2013.01); *H04B 5/0081* (2013.01)

(56) References Cited

U.S. PATENT DOCUMENTS

2014/0203985 A1 7/2014 Tsubaki et al.
2016/0371580 A1* 12/2016 Kunc ................. G06K 19/0715

* cited by examiner

ANTENNA DEVICE, ANTENNA MODULE, AND COMMUNICATION TERMINAL APPARATUS

CROSS REFERENCE TO RELATED APPLICATIONS

This application claims the benefit of priority to Japanese Patent Application No. 2014-136911 filed on Jul. 2, 2014 and is a Continuation application of PCT Application No. PCT/JP2015/066142 filed on Jun. 4, 2015. The entire contents of each application are hereby incorporated herein by reference.

BACKGROUND OF THE INVENTION

1. Field of the Invention

The present invention relates to an antenna device including an antenna coil and an IC connected to the antenna coil, an antenna module including the antenna device, and a communication terminal apparatus.

2. Description of the Related Art

International Publication No. 2013/161608 discloses an antenna device including an antenna coil and an IC. The antenna device disclosed in International Publication No. 2013/161608 is configured such that the antenna coil is formed in a multilayer body, the IC is mounted on the multilayer body, and the IC is connected in parallel with the antenna coil.

In the antenna device disclosed in International Publication No. 2013/161608, the antenna coil and the IC are integrated with each other, so that it is possible to handle the antenna coil and the IC as one component. By mounting this component, for example, on a circuit board, an electronic apparatus supporting NFC (Near Field Communication), which is performed in the HF (high frequency) band, is configured.

However, regarding the antenna device in which the antenna coil and the IC are integrated with each other as disclosed in International Publication No. 2013/161608, the IC of the antenna device can operate even in a state of the antenna device as a single body before the antenna device is incorporated into an electronic apparatus. For example, during transport or the like of the antenna device, even in a state of the antenna device as a single body, when the antenna device comes close to a communication partner apparatus such as a reader/writer, the antenna coil magnetically couples with an antenna of the communication partner apparatus, and the IC operates, so that false information may be written into the IC.

SUMMARY OF THE INVENTION

Preferred embodiments of the present invention provide an antenna device and an antenna module that significantly reduce or prevent malfunctions before being incorporated into an electronic apparatus, and a communication terminal apparatus including the antenna device and the antenna module.

An antenna device according to a preferred embodiment of the present invention includes an antenna coil including a first end and a second end, an IC including at least a first terminal and a second terminal, and a plurality of external terminals; when the antenna device is not electrically connected to an external connection member, a closed loop is not defined by the antenna coil and the IC; and when the antenna device is electrically connected to the external connection member, the plurality of external terminals are electrically connected to the external connection member, or the plurality of external terminals are electrically connected to a conductor pattern provided in the external connection member, to define a closed loop including the antenna coil and the IC.

An antenna module according to a preferred embodiment of the present invention includes the antenna device and the external connection member to which the antenna device is electrically connected, and the external connection member includes a circuit defining a closed loop with the antenna coil and the IC.

A communication terminal apparatus according to a preferred embodiment of the present invention includes the antenna device or an antenna module.

According to various preferred embodiments of the present invention, antenna devices are provided in which an IC does not malfunction even when the antenna device comes close to a communication partner device, for example, when the antenna device is a single body and comes close to a reader/writer during transport of the antenna device. In addition, antenna modules including predetermined antenna characteristics and communication terminal apparatuses are easily provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be clarified through description of specific preferred embodiments of the present invention with reference to the drawings. In each preferred embodiment of the present invention, the description of common elements and features is omitted, and the differences between the preferred embodiments are mainly described. In particular, the same advantageous effects achieved by a same or a similar configuration are not mentioned successively in each preferred embodiment.

First Preferred Embodiment

Figure 1A:
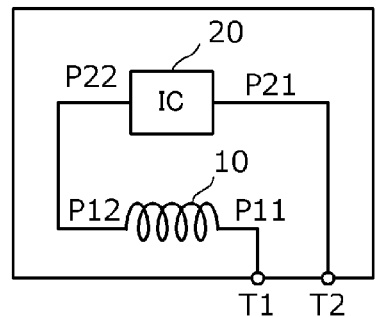
FIGS. 1A, 1B, and 1C are circuit diagrams of antenna devices according to a first preferred embodiment of the present invention.
Figure 1B:
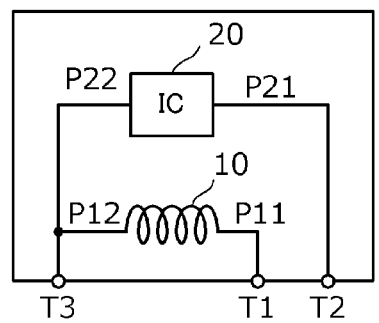
Figure 1C:
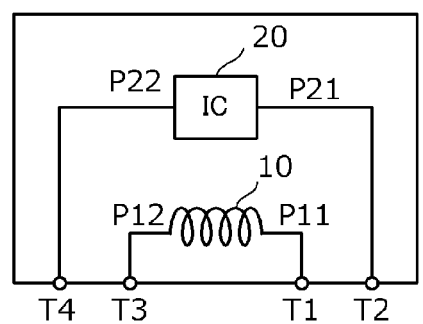
Figure 2:
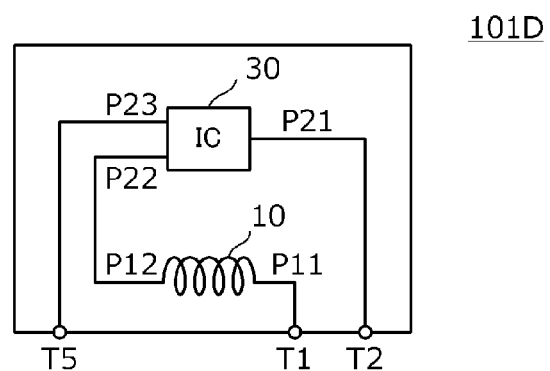
FIG. 2 is a circuit diagram of another antenna device according to the first preferred embodiment of the present invention.

FIGS. 1A, 1B, and 1C are circuit diagrams of antenna devices according to a first preferred embodiment of the present invention. FIG. 2 is a circuit diagram of another antenna device according to the first preferred embodiment.

Each of the antenna device 101A in FIG. 1A, the antenna device 101B in FIG. 1B, the antenna device 101C in FIG. 1C, and the antenna device 101D in FIG. 2 includes an antenna coil 10 and an IC 20. The antenna coil 10 includes a first end P11 and a second end P12. The IC 20 shown in each of FIGS. 1A, 1B, and 1C includes a first terminal P21 and a second terminal P22. The IC 30 shown in FIG. 2 includes a first terminal P21, a second terminal P22, and a third terminal P23.

Each of the ICs 20 and 30 is an RF-IC that magnetically couples with an antenna device of a communication partner via the antenna coil 10 to perform, for example, NFC communication, and is, for example, an IC of a RF-IC tag.

In the antenna device 101A shown in FIG. 1A, the first end P11 of the antenna coil 10 is connected to a first external terminal T1, and the first terminal P21 of the IC 20 is connected to a second external terminal T2. In addition, the second end P12 of the antenna coil 10 and the second terminal P22 of the IC 20 are connected to each other. When the antenna device 101A is mounted on a circuit board, the first external terminal T1 and the second external terminal T2 are connected to conductor patterns provided on the circuit board. Accordingly, a current path including the antenna coil 10 and the IC 20 is defined. When the antenna device 101A is a single body, before the antenna device 101A is mounted on the circuit board, the current path described above is not defined. In other words, a closed loop is not defined. Therefore, when the antenna device 101A is a single body, even when a magnetic flux links to the antenna coil 10, a current does not flow, and even when the antenna device 101A comes close to a communication partner device such as a reader/writer antenna, the IC does not malfunction.

As described above, when the antenna device 101A is not mounted on the circuit board, a closed loop is not defined by the antenna coil 10 and the IC 20. Accordingly, when the antenna device 101A is not mounted on the circuit board, at least one end of the antenna coil 10 is not connected to the IC 20. In the first preferred embodiment, the first end P11 of the antenna coil 10 is connected to the first external terminal T1 and is not connected to the IC 20.

The electrical connection between the first external terminal T1 and the second external terminal T2 is not limited to the conductor pattern provided on the circuit board. For example, the first external terminal T1 and the second external terminal T2 may be electrically connected to each other by a portion of the surface of a shield member or a metal housing of a communication apparatus. That is, the connection member to which the antenna device is connected may be a conductive member or a member on which a conductor pattern is provided, in addition to the circuit board on which the conductor pattern is provided.

In the antenna device 101B shown in FIG. 1B, the second end P12 of the antenna coil 10 is connected to a third external terminal T3. The third external terminal T3 is also connected to the second terminal P22 of the IC 20. According to the configuration described above, when the antenna device 101B is mounted on a circuit board, an external circuit is connected between the first external terminal T1 and the second external terminal T2, so that, as seen from the IC 20, not only are the antenna coil 10 and the external circuit connected in series, the external circuit is also connected between the first external terminal T1 and the third external terminal T3. In addition, the first external terminal T1 and the second external terminal T2 are connected to a conductor pattern provided on the circuit board, so that the antenna coil 10 and the external circuit are connected in parallel as seen from the IC 20.

When one end of the antenna coil 10 and one end of the IC 20 are connected to each other within an antenna device, for example, one of the antenna devices 101A and 101B, the number of required external terminals is able to be reduced.

In the antenna device 101C shown in FIG. 1C, the first end P11 of the antenna coil 10 is connected to the first external terminal T1, the first terminal P21 of the IC 20 is connected to the second external terminal T2, the second end P12 of the antenna coil 10 is connected to the third external terminal T3, and the second terminal P22 of the IC 20 is connected to a fourth external terminal T4. According to the configuration described above, it is difficult and complex to connect an external circuit provided on a circuit board to the antenna device 101C or the IC 20.

In the antenna device 101D shown in FIG. 2, the IC 30 includes a third terminal P23. The first end P11 of the antenna coil 10 is connected to the first external terminal T1, the first terminal P21 of the IC 30 is connected to the second external terminal T2, and the third terminal P23 of the IC 30 is connected to a fifth external terminal T5. According to the configuration described above, the features of the IC 30 may be effectively provided by a circuit connected to the fifth external terminal T5. For example, a voltage may be applied to the IC 30 via the fifth external terminal T5 or the IC 30 may be connected to a ground conductor via the fifth external terminal T5.

Second Preferred Embodiment

Figure 3:
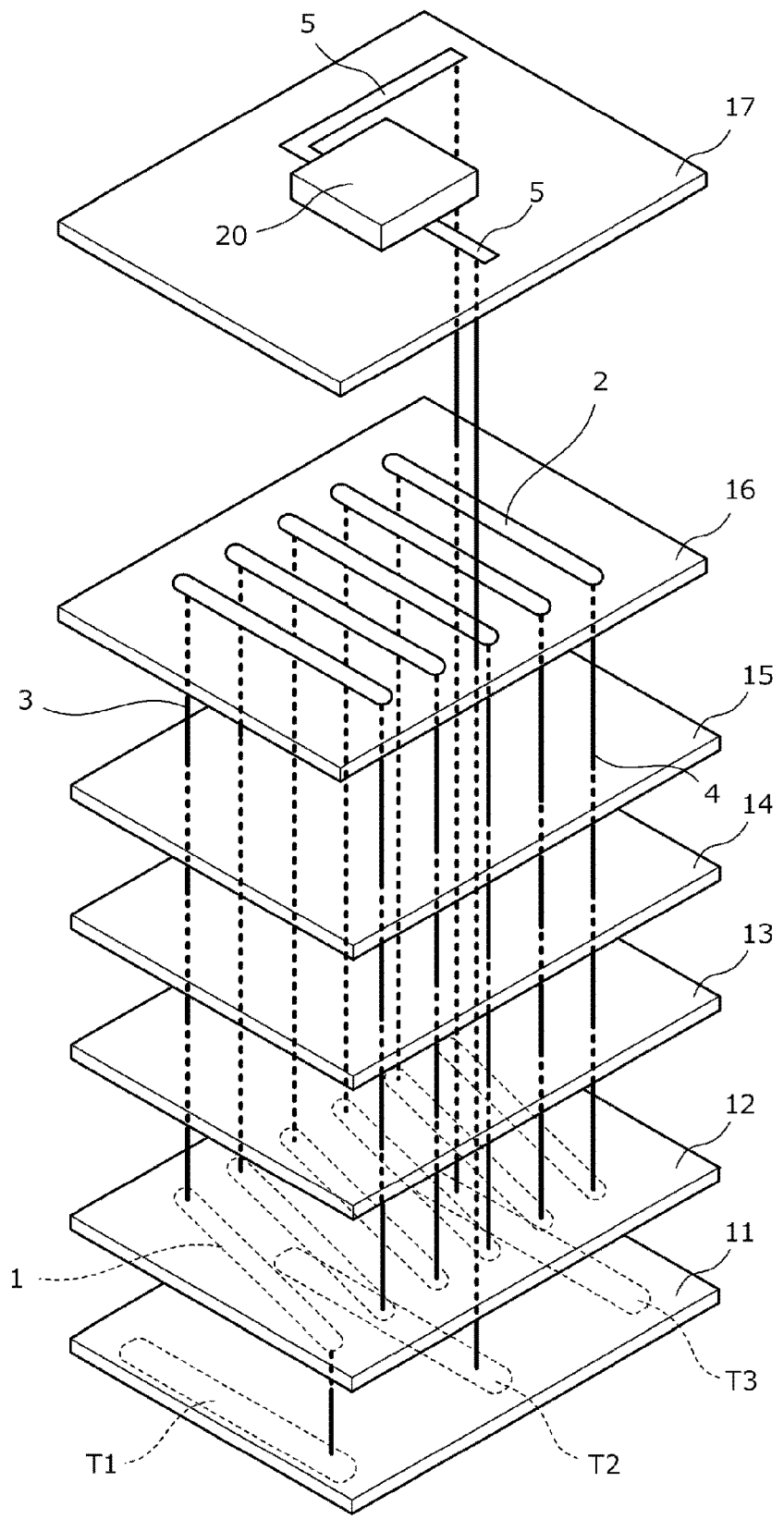
FIG. 3 is an exploded perspective view of an antenna device according to a second preferred embodiment of the present invention.

FIG. 3 is an exploded perspective view of an antenna device 102A according to a second preferred embodiment of the present invention. The antenna device 102A is a multi-layer body including a plurality of ferrite sheets 11 to 17. A plurality of linear conductor patterns 1 of a coil conductor are provided on a lower surface of the ferrite sheet 12. A plurality of linear conductor patterns 2 of the coil conductor are provided on an upper surface of the ferrite sheet 16. A plurality of via-conductors 3 and 4 of the coil conductor are provided in the ferrite sheets 12 to 16. These via-conductors 3 connect first ends of the plurality of linear conductor patterns 1 and first ends of the linear conductor patterns 2. In addition, the via-conductors 4 connect second ends of the plurality of linear conductor patterns 1 and second ends of the linear conductor patterns 2. The linear conductor patterns 1 and 2 and the via-conductors 3 and 4 define a helical antenna coil along a horizontal flattened square or substantially square tube. However, instead of the via-conductors 3 and 4 connecting the plurality of linear conductor patterns 1 and the linear conductor patterns 2, the linear conductor patterns 1 and 2 may be extended to end surfaces of the ferrite sheets 12 and 16, and linear conductor patterns may be provided on the end surfaces of the ferrite sheets 12 to 16, so that the plurality of linear conductor patterns 1 and 2 are connected by the linear conductor patterns. In addition, conductor patterns may be provided on the ferrite sheets such that the winding axis of an antenna coil is parallel or substantially parallel to a lamination direction of the multilayer body, and a helical antenna coil with a winding axis parallel or substantially parallel to the lamination direction of the multilayer body may be included.

A first external terminal T1, a second external terminal T2, and a third external terminal T3 are provided on a lower surface of the ferrite sheet 11. An end portion of one of the plurality of linear conductor patterns 1 of the antenna coil is connected to the first external terminal T1 by a via-conductor. In addition, an end portion of one of the plurality of linear conductor patterns 1 of the antenna coil is connected to the third external terminal T3 by a via-conductor.

A wiring pattern 5 on which an IC 20 is mounted is provided on an upper surface of the ferrite sheet 17. The IC 20 is connected to each of the second external terminal T2 and the third external terminal T3 via the wiring pattern 5 and a via-conductor. That is, in the second preferred embodiment, the structure of the antenna device 101B in FIG. 1B is shown. The antenna device in each of FIGS. 1A, 1C, and 2 may be defined by ferrite sheets, and conductor patterns and via-conductors provided thereon and therein, and the like, similar to the second preferred embodiment.

When the IC 20 is disposed on the surface of the multilayer body as described above, the structure of the multilayer body is simple, and a reduction in cost is able to be obtained.

In FIG. 3, each of the ferrite sheets 11 to 17 is a nonmagnetic material ferrite sheet or a magnetic material ferrite sheet. For example, the ferrite sheets 12 to 16 that are within a winding range of the antenna coil are magnetic material ferrite sheets, and the other ferrite sheets are nonmagnetic material ferrite sheets. The multilayer body including the ferrite sheets 11 to 17 is sintered and defines a single body. According to the structure described above, an antenna coil is provided with a small size and a high magnetic permeability within the winding range of the antenna coil, but with a predetermined inductance. In addition, magnetic coupling with a communication partner antenna is able to be easily enhanced.

Figure 4:
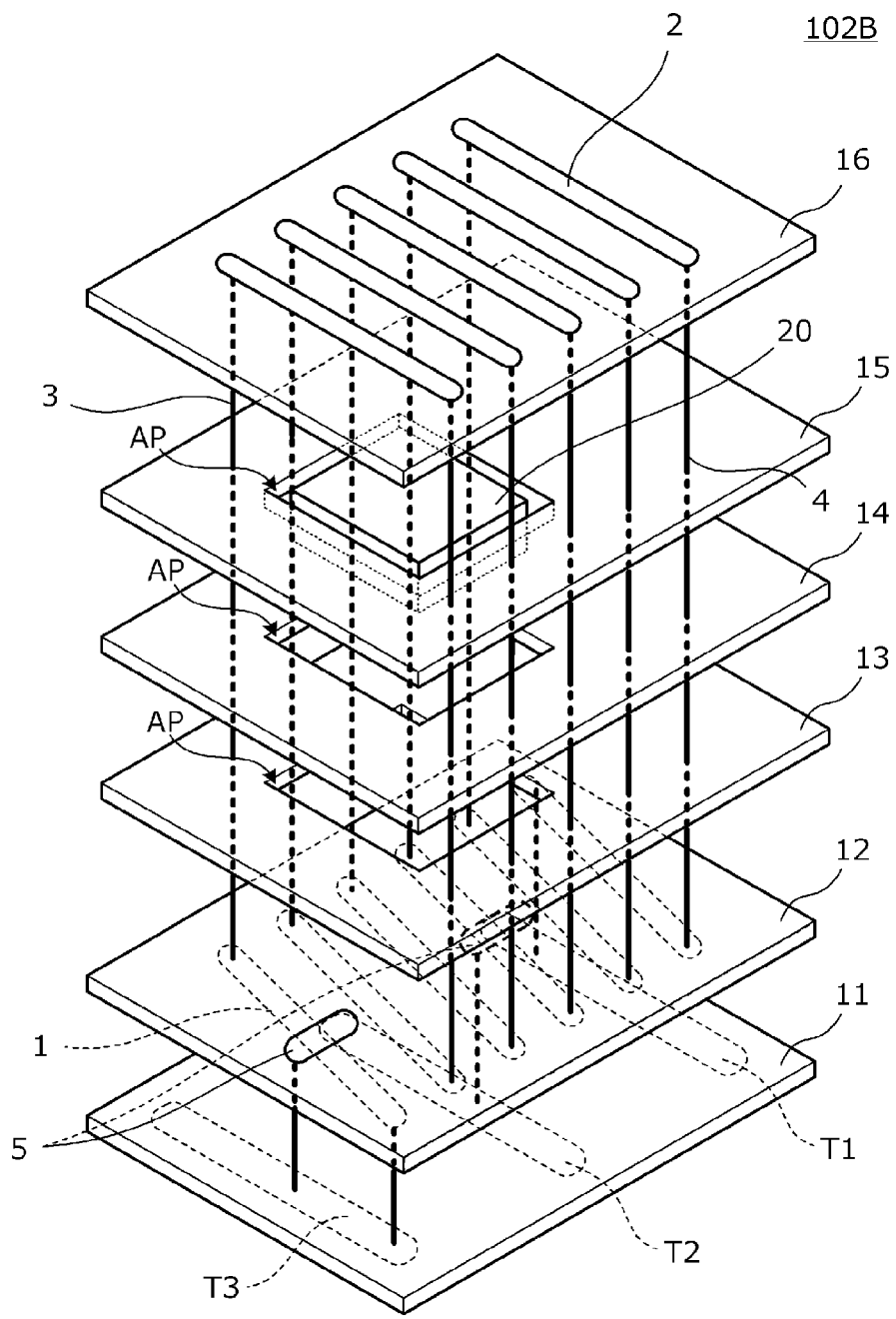
FIG. 4 is an exploded perspective view of another antenna device according to the second preferred embodiment of the present invention.

In the second preferred embodiment of the present invention, as described above, the multilayer body includes the ferrite sheets, but the features and elements of the antenna device are not limited thereto. FIG. 4 is an exploded perspective view of another antenna device 102B according to the second preferred embodiment. The antenna device 102B includes a resin multilayer board that is a multilayer body including a plurality of resin sheets 11 to 16 made of, for example, polyimide, a liquid crystal polymer, or the like. A plurality of linear conductor patterns 1 of a coil conductor are provided on a lower surface of the resin sheet 12. A plurality of linear conductor patterns 2 of the coil conductor are provided on an upper surface of the resin sheet 16. A plurality of via-conductors 3 and 4 of the coil conductor are provided in the resin sheets 12 to 16. Similar to the example shown in FIG. 3, the linear conductor patterns 1 and 2 and the via-conductors 3 and 4 define a helical antenna coil along a horizontal flattened square or substantially square tube.

Each of the resin sheets 13, 14, and 15 includes an aperture AP located in a central portion thereof. These apertures AP are stacked to define a cavity, and an IC 20 is buried within the cavity. Two wiring patterns 5, to which a first end and a second end of the IC 20 are conducted, are provided on an upper surface of the resin sheet 12. These wiring patterns 5 are respectively connected to the external terminals T2 and T3 through via conductors. In the second preferred embodiment, the structure of the antenna device 101B in FIG. 1B is shown. However, the antenna device in each of FIGS. 1A, 1C, and 2, the IC may be located within a resin multilayer board similar to the second preferred embodiment.

When the antenna device includes the resin sheets as described above, an antenna device is able to provided that is more flexible than an antenna device configured with ferrite sheets. In addition, since the antenna device is flexible, the size of the antenna device may be easily increased, and an antenna device with good communication characteristics is able to be provided. Furthermore, when the IC 20 is disposed within the multilayer body, the height of the antenna device may be decreased, so that the antenna device is able to be easily incorporated into an electronic apparatus with a small allowance in a thickness direction thereof. Moreover, by forming another cavity within the antenna coil by the same or substantially the same process as that for the cavity in which the IC 20 is buried and then disposing a magnetic core within the another cavity, an antenna coil that includes a high magnetic permeability and is thin, but includes a predetermined inductance, is able to be provided.

By including a resin sheet with a magnetic ferrite mixed therein as each resin sheet of the resin multilayer board, an antenna coil that includes a high magnetic permeability and is thin, but includes a predetermined inductance, is able to be provided.

Third Preferred Embodiment

Figure 5A:
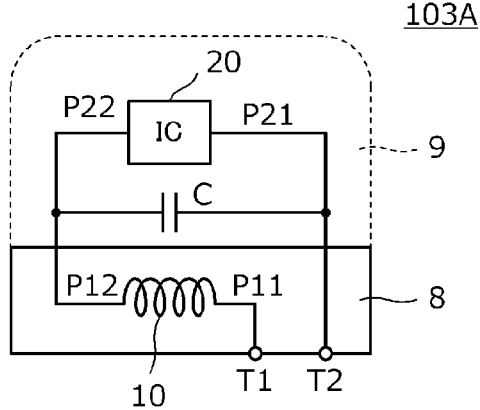
FIGS. 5A and 5B are circuit diagrams showing the structures of antenna devices according to a third preferred embodiment of the present invention.
Figure 5B:
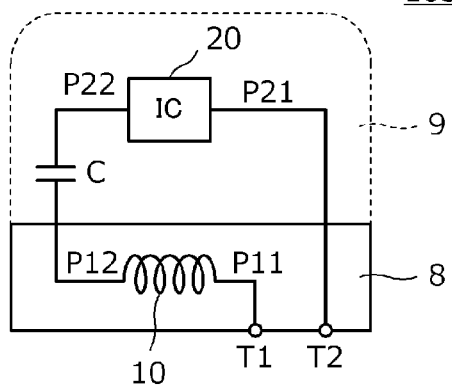

FIGS. 5A and 5B are circuit diagrams showing the structures of antenna devices according to a third preferred embodiment of the present invention. The antenna device 103A in FIG. 5A includes an antenna coil 10, an IC 20, and a capacitor C. A first end P11 of the antenna coil 10 is connected to a first external terminal T1, and a first terminal P21 of the IC 20 is connected to a second external terminal T2. In addition, a second end P12 of the antenna coil 10 and a second terminal P22 of the IC 20 are connected to each other. The capacitor C is connected in parallel with the IC 20. That is, the capacitor C is connected between the first terminal P21 and the second terminal P22.

The antenna device 103B in FIG. 5B includes an antenna coil 10, an IC 20, and a capacitor C. A first end P11 of the antenna coil 10 is connected to a first external terminal T1, and a first terminal P21 of the IC 20 is connected to a second external terminal T2. In addition, the capacitor C is connected between a second end P12 of the antenna coil 10 and a second terminal P22 of the IC 20.

In each of the antenna devices 103A and 103B, the antenna coil 10 is included in a multilayer body 8, as shown in FIGS. 3 and 4. The IC 20 and the capacitor C are mounted on an upper surface of the multilayer body 8. A mold resin 9 is provided on the upper surface of the multilayer body 8.

When one of the antenna devices 103A and 103B is mounted on a circuit board, the first external terminal T1 and the second external terminal T2 are connected to conductor patterns provided on the circuit board. Accordingly, a current path including the antenna coil 10 and the IC 20 is defined.

When the capacitor C is connected between the first terminal P21 and the second terminal P22 of the IC 20 or in series with the first terminal P21 or the second terminal P22 of the IC 20, in accordance with the third preferred embodiment, a capacitance component of an LC resonant circuit defined by the antenna coil 10 and the IC 20 is able to be included in advance. However, instead of the capacitor C, a capacitance pattern with a similar capacitance may be provided within the multilayer body 8.

Fourth Preferred Embodiment

Figure 6A:
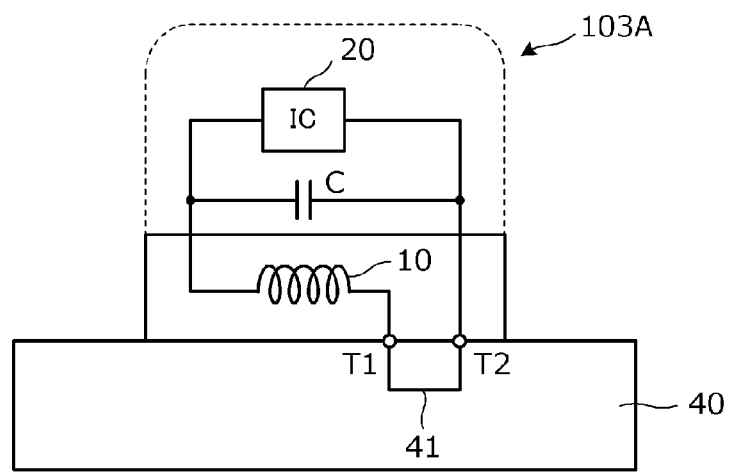
FIGS. 6A and 6B are circuit diagrams showing the structures of antenna modules according to a fourth preferred embodiment of the present invention.
Figure 6B:
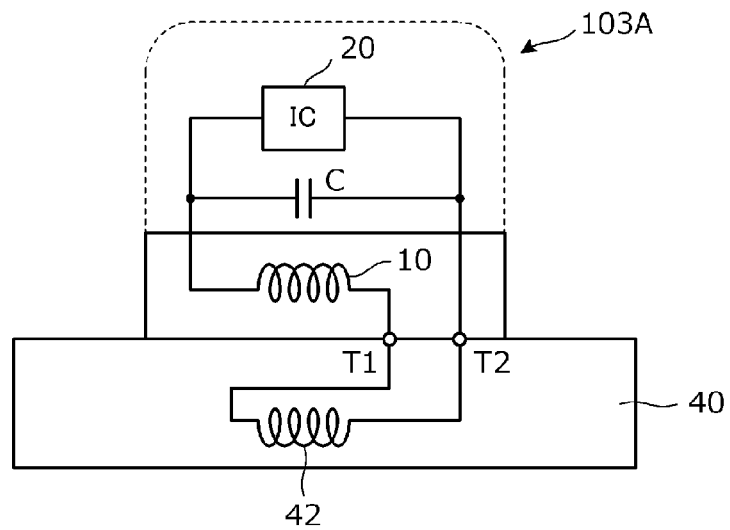

FIGS. 6A and 6B are circuit diagrams showing the structures of antenna modules according to a fourth preferred embodiment of the present invention. Each of the antenna module 204A in FIG. 6A and the antenna module 204B in FIG. 6B includes the antenna device 103A and a circuit board 40.

In the circuit board 40 of the antenna module 204A shown in FIG. 6A, a conductor pattern 41 is connected to the external terminals T1 and T2 of the antenna device 103A. Therefore, when the antenna device 103A is mounted on the circuit board 40, the antenna coil 10, the capacitor C, and the IC 20 are connected in parallel. That is, a current path including the antenna coil 10 and the IC 20 is defined.

In the circuit board 40 of the antenna module 204B shown in FIG. 6B, a loop-shaped conductor pattern 42 is provided. Accordingly, when the antenna device 103A is mounted on the circuit board 40, the loop-shaped conductor pattern 42 is connected to the antenna coil 10, and the capacitor C and the IC 20 are connected in parallel with the series circuit of the loop-shaped conductor pattern 42 and the antenna coil 10.

The loop-shaped conductor pattern 42 of the antenna module 204B shown in FIG. 6B provides a radiating element different from the antenna coil 10, so that an antenna module with high antenna characteristics is able to be provided. For example, due to the coil axis of the antenna coil 10 being different from the coil axis of the loop-shaped conductor pattern 42, an antenna module that also couples with a magnetic flux in a direction different from that of a magnetic flux with which the antenna coil 10 couples is able to be provided. In addition, by defining a loop conductor pattern at a board outer edge or the like, the antenna aperture area is able to be increased, and communication performance may be improved.

According to the fourth preferred embodiment, the antenna coil 10 and the IC 20 are connected to each other, so that the antenna module is able to be handled as a module component in which the antenna device 103A provides its desired features and operation. In addition, predetermined characteristics of the antenna device in the antenna module 204A or 204B are able to be provided.

Fifth Preferred Embodiment

Figure 7A:
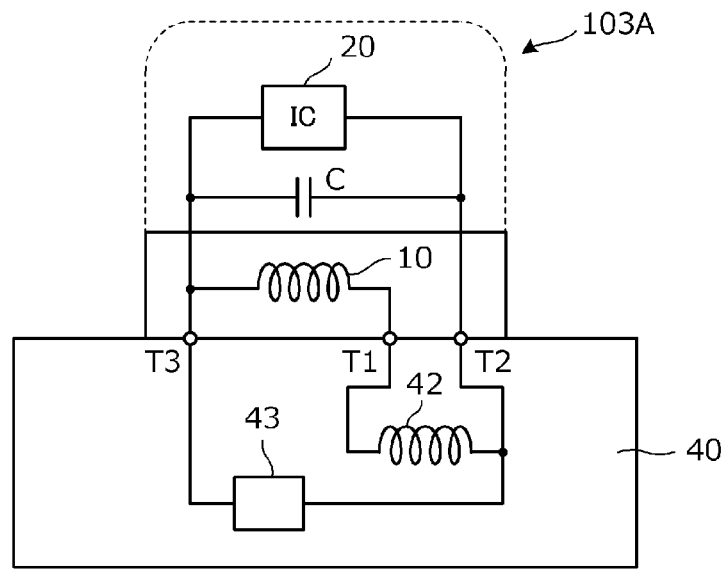
FIGS. 7A and 7B are circuit diagrams of antenna modules according to a fifth preferred embodiment of the present invention.
Figure 7B:
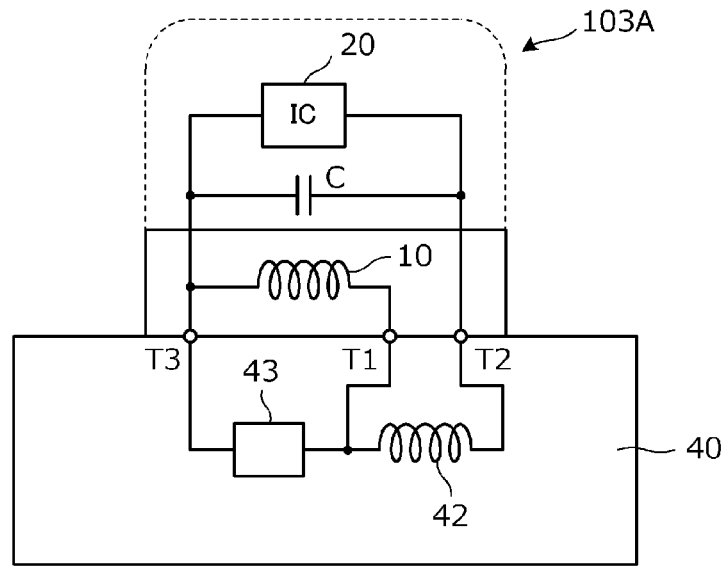

FIGS. 7A and 7B are circuit diagrams of antenna modules according to a fifth preferred embodiment of the present invention. Each of the antenna module 205A in FIG. 7A and the antenna module 205B in FIG. 7B includes the antenna device 103A and a circuit board 40.

The circuit board 40 of the antenna module 205A shown in FIG. 7A includes a loop-shaped conductor pattern 42. In addition, a resonant frequency adjusting impedance element 43 is mounted on the circuit board 40. The external terminals T1 and T2 of the antenna device 103A are connected to the loop-shaped conductor pattern 42. The external terminals T2 and T3 of the antenna device 103A are connected to the resonant frequency adjusting impedance element 43. Therefore, when the antenna device 103A is mounted on the circuit board 40, the loop-shaped conductor pattern 42 is connected in series with the antenna coil 10, the capacitor C and the IC 20 are connected in parallel with the series circuit of the loop-shaped conductor pattern 42 and the antenna coil 10. Furthermore, the resonant frequency adjusting impedance element 43 is connected in parallel with the series circuit of the loop-shaped conductor pattern 42 and the antenna coil 10.

In the circuit board 40 of the antenna module 205B shown in FIG. 7B, a loop-shaped conductor pattern 42 is provided. In addition, a resonant frequency adjusting impedance element 43 is mounted on the circuit board 40. The external terminals T1 and T2 of the antenna device 103A are connected to the loop-shaped conductor pattern 42. The external terminals T1 and T3 of the antenna device 103A are connected to the resonant frequency adjusting impedance element 43. Therefore, when the antenna device 103A is mounted on the circuit board 40, the loop-shaped conductor pattern 42 is connected in series with the antenna coil 10, the capacitor C and the IC 20 are connected in series with the series circuit of the loop-shaped conductor pattern 42 and the antenna coil 10. Furthermore, the resonant frequency adjusting impedance element 43 is connected in parallel with the antenna coil 10.

The resonant frequency adjusting impedance element 43 is a chip capacitor or a chip inductor, and the resonant frequency of a resonant circuit including the antenna coil 10, the loop-shaped conductor pattern 42, and the capacitor C is set to a predetermined value on the basis of the reactance of the chip capacitor or the chip inductor. Instead of the impedance element 43, the circuit board 40 may include a predetermined impedance-defining conductor pattern.

By including the resonant frequency adjusting element at the circuit board side as described above, an antenna module is able to be provided that includes different resonant frequency characteristics, even when only a single type of antenna device is included.

Sixth Preferred Embodiment

Figure 8:
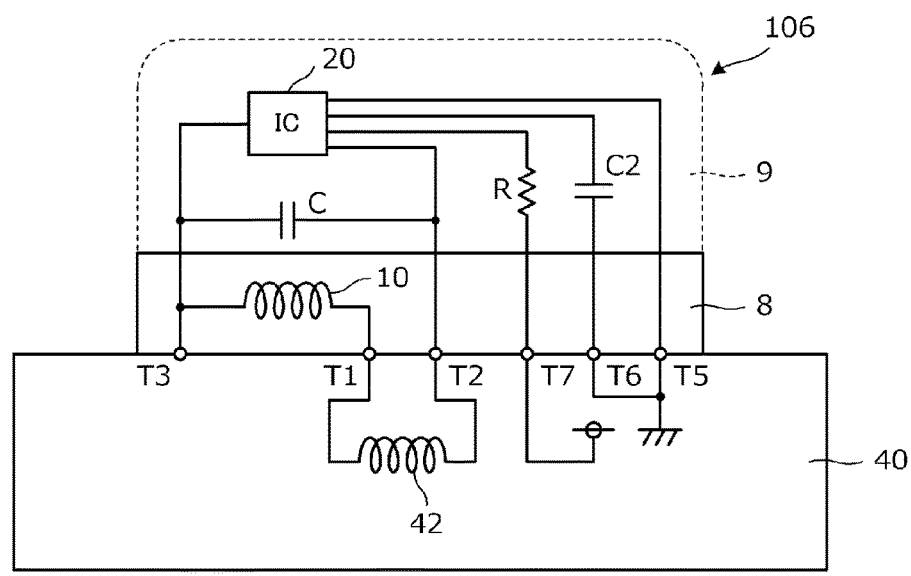
FIG. 8 is a circuit diagram of an antenna device and an antenna module according to a sixth preferred embodiment of the present invention.

FIG. 8 is a circuit diagram of an antenna device and an antenna module according to a sixth preferred embodiment of the present invention. The antenna module 206 includes an antenna device 106 and a circuit board 40. The antenna device 106 includes an antenna coil 10, an IC 20, capacitors C and C2, and a resistor R. The antenna coil 10 is included in a multilayer body 8, and the other elements are mounted on the multilayer body 8. In addition to external terminals T1, T2, and T3, external terminals T5, T6, and T7 are provided in the antenna device 106. A ground terminal of the IC 20 is connected to the external terminal T5, and a power supply terminal of the IC 20 is connected to the external terminal T7 via the resistor R.

A loop-shaped conductor pattern 42 and other circuits are provided in the circuit board 40. Therefore, when the antenna device 106 is mounted on the circuit board 40, the loop-shaped conductor pattern 42 is connected in series with the antenna coil 10, and the capacitor C and the IC 20 are connected in parallel with the series circuit of the loop-shaped conductor pattern 42 and the antenna coil 10. In addition, an external circuit is connected to the IC 20 via the resistor R and the smoothing capacitor C2.

Seventh Preferred Embodiment

Figure 9:
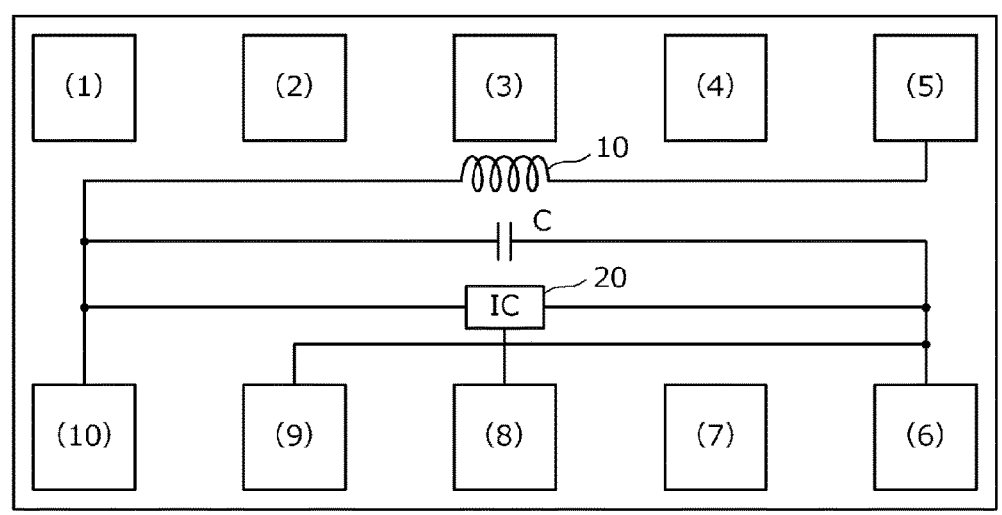
FIG. 9 is a plan view of a mount surface side of an antenna device according to a seventh preferred embodiment of the present invention.

FIG. 9 is a plan view of a mount surface side of an antenna device 107 according to a seventh preferred embodiment of the present invention. FIG. 9 also shows a circuit diagram of a circuit provided in the antenna device 107. The antenna device 107 includes 10 external terminals shown by (1) to (10).

Figure 10:
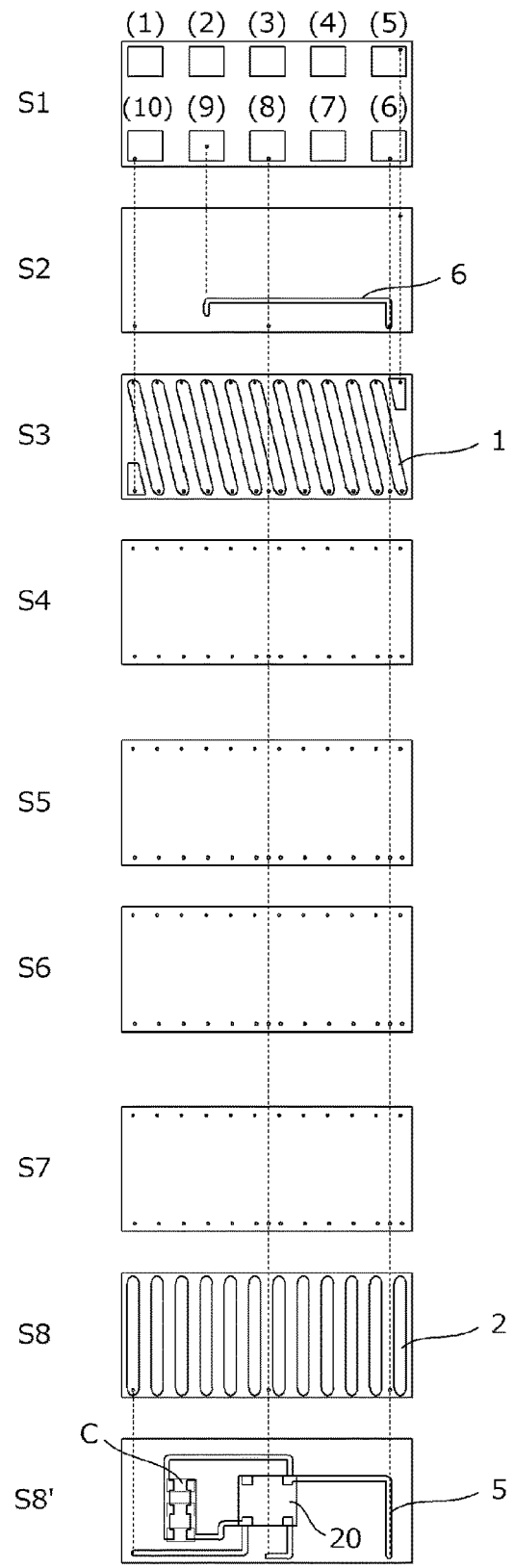
FIG. 10 is a plan view of each base layer of a multilayer body included in the antenna device shown in FIG. 9.

FIG. 10 is a plan view of each base layer of a multilayer body included in the antenna device 107. In the example shown in FIG. 10, eight base layers S1 to S8 are included. In FIG. 10, a diagram shown by S8' is a plan view of a back surface of the base layer S8 (a surface on which components such as an IC are mounted).

In FIG. 10, a plurality of linear conductor patterns 1 of a coil conductor is provided on an upper surface of the base layer S3. A plurality of linear conductor patterns 2 of the coil conductor are provided on an upper surface of a base layer S8. A plurality of via-conductors of the coil conductor is provided in the base layers S3 to S7. The via-conductors and the linear conductor patterns 1 and 2 define an antenna coil.

A wiring pattern 6 connecting the external terminal (6) and the external terminal (9) is provided on the base layer S2. A wiring pattern 5 is provided on the lower surface of the base layer S8. The lower surface of the base layer S8 corresponds to an upper surface of the multilayer body, and an IC 20 and a capacitor C are mounted thereon.

Figure 11A:
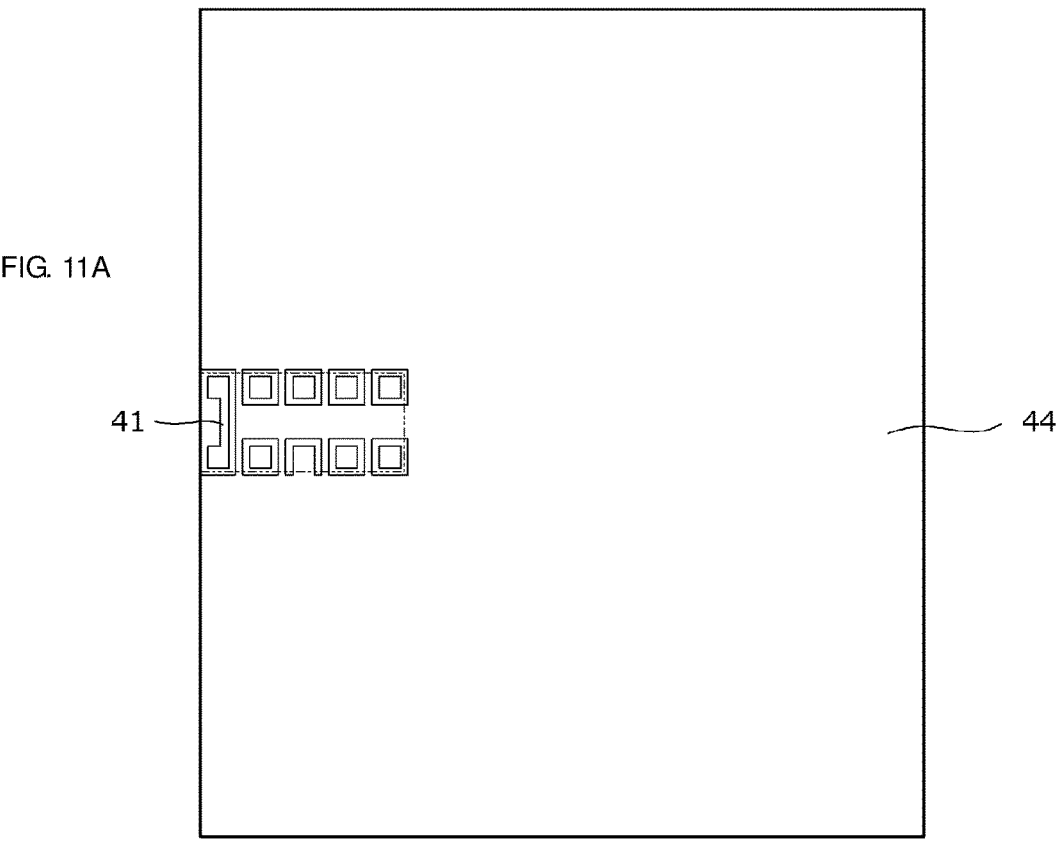
FIG. 11A is a plan view of a circuit board on which the antenna device shown in FIG. 9 is mounted.
Figure 11B:
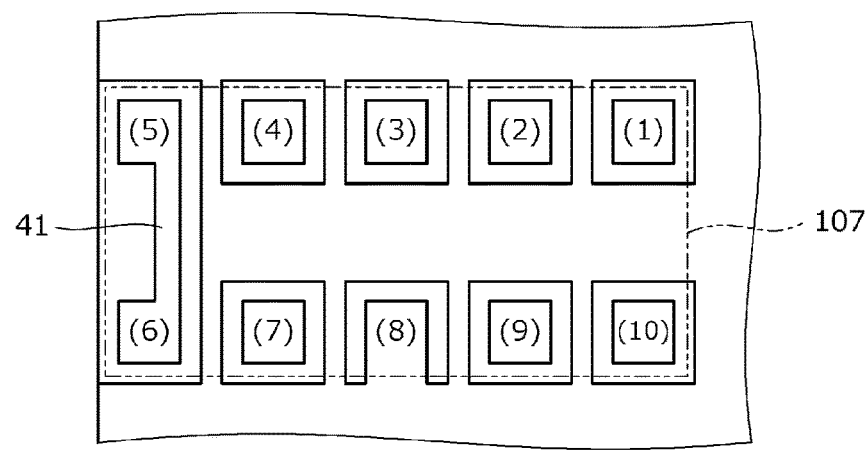
FIG. 11B is an enlarged plan view of an antenna device mounting portion of the circuit board.

FIG. 11A is a plan view of a circuit board 40 on which the antenna device 107 is mounted, and FIG. 11B is an enlarged plan view of an antenna device mounting portion of the circuit board 40. Reference characters (1) to (10) allocated to lands in the mounted portion are reference characters for the external terminals of the antenna device 107 connected to these lands.

A ground conductor 44 with a planar or a substantially planar shape is provided on the circuit board 40. The land to which the external terminal (8) of the antenna device 107 is connected is connected to the ground conductor 44. A conductor pattern 41 is provided on the antenna device mounting portion. The external terminals (5) and (6) of the antenna device 107 are connected to each other via the conductor pattern 41.

When the antenna device 107 is mounted on the circuit board 40, an antenna module is provided. Since the ground conductor 44 of the circuit board 40 spreads along or substantially along the winding axis direction of the antenna coil of the antenna device 107, a magnetic flux in a direction perpendicular or substantially perpendicular to a principal surface of the circuit board 40 changes in direction near the surface of the ground conductor 44 so as to travel along the ground conductor 44, and is guided to the antenna device 107. Thus, the antenna device 107 is able to effectively generate and advantageously utilize a magnetic flux orthogonal or substantially orthogonal to the winding axis of the antenna coil of the antenna device 107, for communication.

In addition, for example, by the antenna coil and the ground conductor 44 electromagnetically coupling with each other in the HF band, a current flowing along an edge portion of the ground conductor 44 is induced. As a result, the ground conductor 44 defines and functions as a radiating element.

In the example shown in FIGS. 11A and 11B, the conductor pattern 41 is separated from the ground conductor 44. However, the conductor pattern 41 may be connected to the ground conductor 44.

Eighth Preferred Embodiment

Figure 12A:
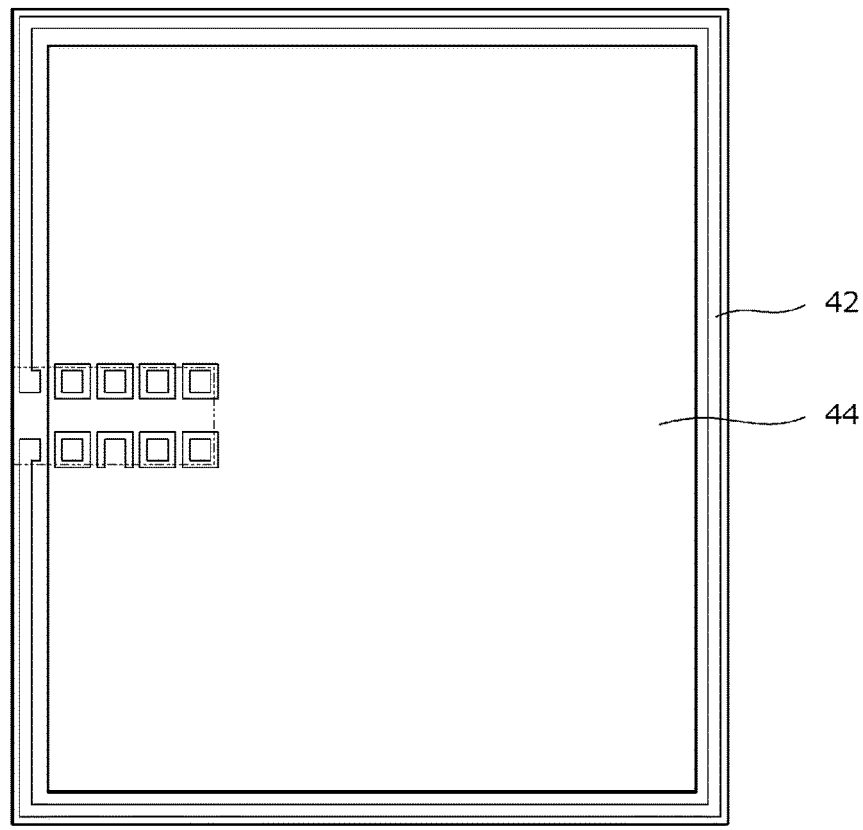
FIG. 12A is a plan view of a circuit board of an antenna module according to an eighth preferred embodiment of the present invention.
Figure 12B:
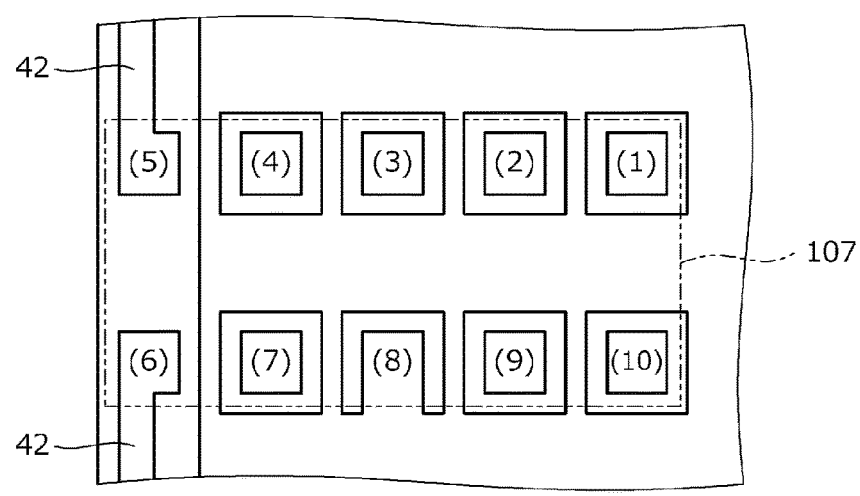
FIG. 12B is an enlarged plan view of an antenna device mounting portion of the circuit board.

FIG. 12A is a plan view of a circuit board 40 of an antenna module according to an eighth preferred embodiment of the present invention, and FIG. 12B is an enlarged plan view of an antenna device mounting portion of the circuit board 40. The configuration of an antenna device 107 mounted on the circuit board 40 is the same or substantially the same as the seventh preferred embodiment.

A ground conductor 44 with a planar or a substantially planar shape and a loop-shaped conductor pattern 42 are provided on the circuit board 40. Both ends of the loop-shaped conductor pattern 42 are connected to lands to which the external terminals (5) and (6) of the antenna device are connected.

The loop-shaped conductor pattern 42 is connected in series with the antenna coil of the antenna device 107. The loop-shaped conductor pattern 42 provides a radiating element different from the antenna coil. The winding axis of the loop-shaped conductor pattern 42 is orthogonal or substantially orthogonal to the winding axis of the antenna coil. A gap is provided between the loop-shaped conductor pattern 42 and the ground conductor 44. Thus, by a magnetic flux passing through the gap between the loop-shaped conductor pattern 42 and the ground conductor 44, the loop-shaped conductor pattern 42 magnetically couples with a communication partner side antenna. Therefore, the loop-shaped conductor pattern 42 defines and functions as a radiating element for a magnetic field in a direction perpendicular or substantially perpendicular to a principal surface of the circuit board 40, and the antenna coil of the antenna device 107 defines and functions as a radiating element for a magnetic field in the principal surface direction of the circuit board 40.

Figure 13:
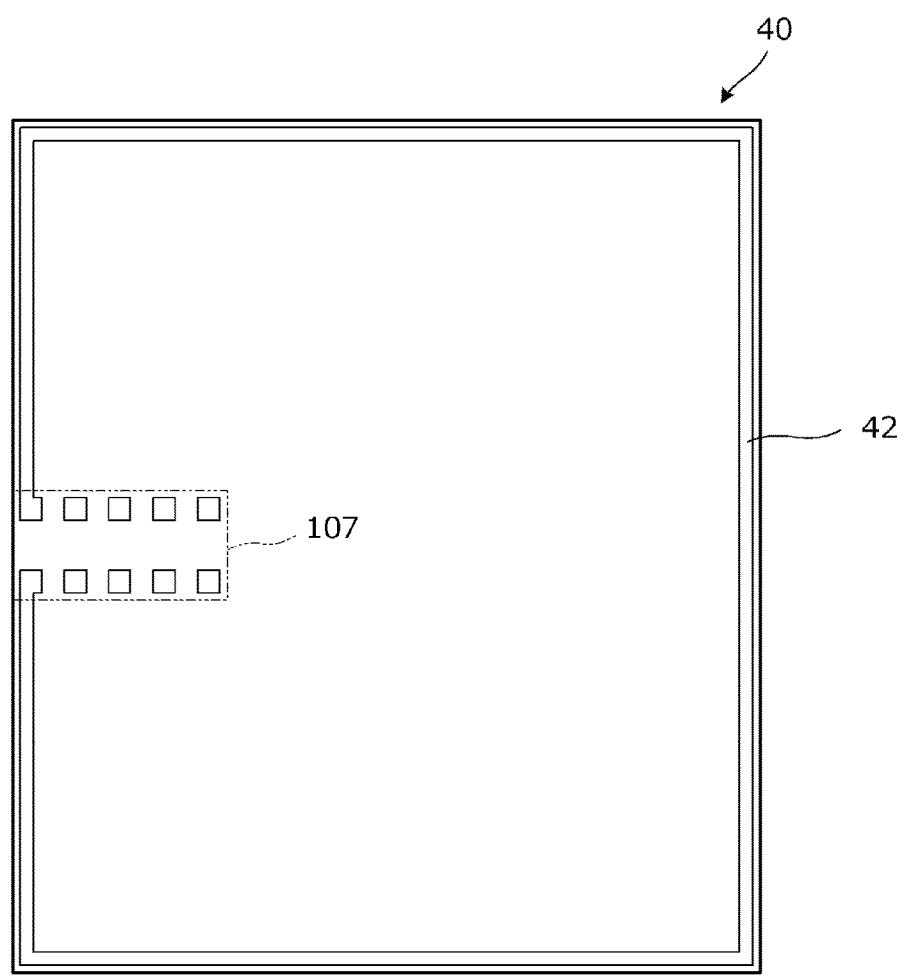
FIG. 13 is a plan view of a circuit board of another antenna module according to the eighth preferred embodiment of the present invention.

FIG. 13 is a plan view of a circuit board 40 of another antenna module according to the eighth preferred embodiment. In the example shown in FIG. 13, a loop-shaped conductor pattern 42 is provided along the peripheral edge of the circuit board 40. On the circuit board 40, there is no ground conductor with a planar or a substantially planar shape. According to the configuration described above, a coil aperture of the loop-shaped conductor pattern 42 is widely open, and thus the loop-shaped conductor pattern 42 strongly couples with a magnetic field in the direction perpendicular or substantially perpendicular to a principal surface of the circuit board 40.

Ninth Preferred Embodiment

Figure 14A:
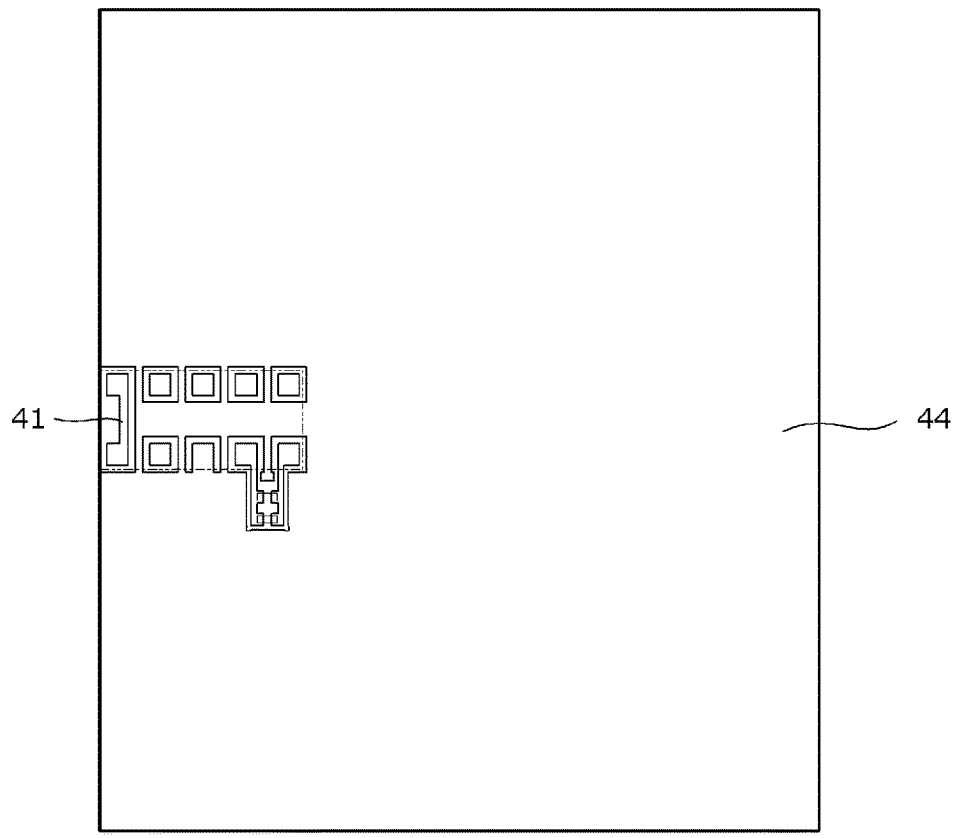
FIG. 14A is a plan view of a circuit board of an antenna module according to a ninth preferred embodiment of the present invention.
Figure 14B:
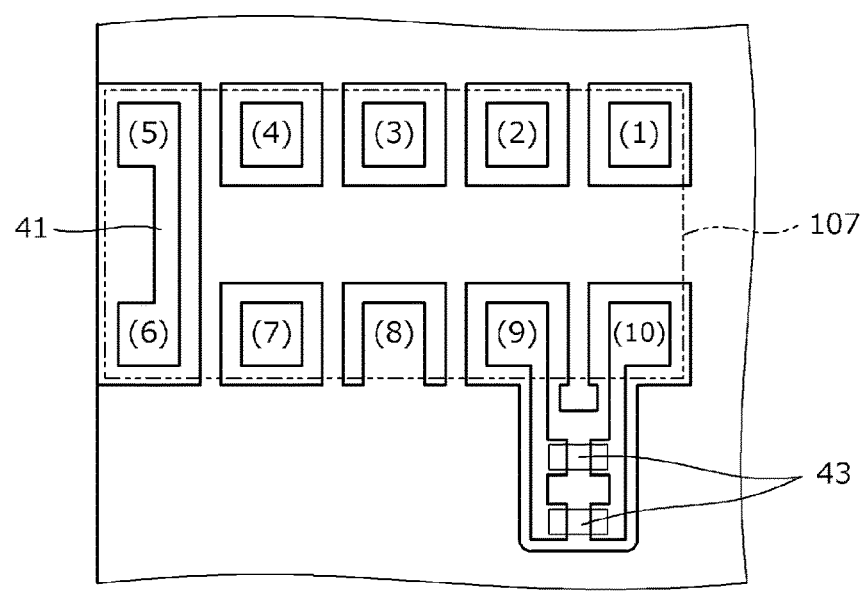
FIG. 14B is an enlarged plan view of an antenna device mounting portion of the circuit board.

FIG. 14A is a plan view of a circuit board 40 of an antenna module according to a ninth preferred embodiment of the present invention, and FIG. 14B is an enlarged plan view of an antenna device mounting portion of the circuit board 40. The configuration of an antenna device 107 mounted on the circuit board 40 is the same or substantially the same as the seventh preferred embodiment.

A ground conductor 44 with a planar or a substantially planar shape is provided on the circuit board 40. In addition, lands to which resonant frequency adjusting impedance elements 43 are connected are provided on the circuit board 40. These lands are connected to lands to which the external terminals (9) and (10) of the antenna device are connected. Each of the resonant frequency adjusting impedance elements 43 is a reactance element such as a chip capacitor or a chip inductor, and the resonant frequency is able to be finely adjusted according to the values of the reactance elements.

Tenth Preferred Embodiment

Figure 15:
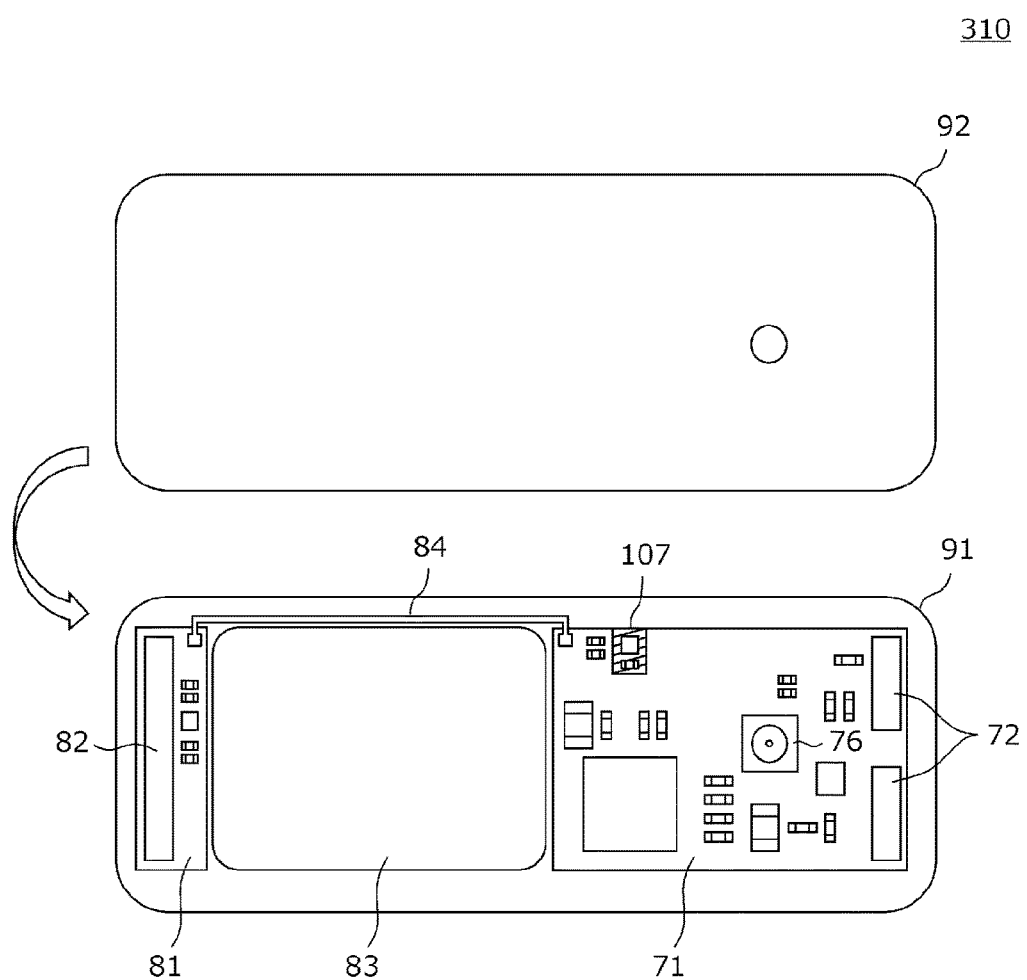
FIG. 15 is a diagram showing the structure inside a housing of a radio communication apparatus according to a tenth preferred embodiment of the present invention.

FIG. 15 is a diagram showing the structure inside a housing of a radio communication apparatus 310 according to a tenth preferred embodiment of the present invention. More specifically, FIG. 15 is a plan view showing an interior of a radio communication apparatus 310 exposed by separating a lower housing 92 and an upper housing 91. Circuit boards 71 and 81, a battery pack 83, and the like are housed within the upper housing 91. An antenna device 107 is mounted on the circuit board 71. A UHF-band (ultra-high frequency band) antenna 72, a camera module 76, and the like are also mounted on the circuit board 71. In addition, a UHF-band antenna 82 and the like are mounted on the circuit board 81. The circuit board 71 and the circuit board 81 are connected to each other via a coaxial cable 84.

A conductor pattern that is the same or substantially the same as the conductor pattern 41 shown in FIG. 11A is provided on the circuit board 71. When the antenna device 107 is a single body, that is, before the antenna device 107 is mounted on the circuit board 71, the IC mounted on the antenna device 107 does not malfunction, even when the antenna device 107 comes close to a reader/writer or the like during transport of the antenna device 107. When the antenna device 107 is mounted on the circuit board 71, the antenna device 107 properly defines and functions as an antenna device.

A communication terminal apparatus may be provided by attaching any of the antenna modules shown in FIGS. 6 to 8 to the inner surface of the housing.

In addition to any of the antenna modules shown in FIGS. 6 to 8, an auxiliary antenna coil may also be included within the housing of the radio communication apparatus 310, and the antenna coil or the loop-shaped conductor pattern of the antenna module may be magnetically coupled with the auxiliary antenna coil to cause the auxiliary antenna coil to operate as a booster antenna. Moreover, if the housing of the radio communication apparatus 310 is a conductive member of a metal or the like, a loop may be provided by the conductive member (the housing), and the antenna coil or the loop-shaped conductor pattern of any of the antenna modules shown in FIGS. 6 to 8 may be magnetically coupled with the loop provided by the conductive member (the housing) to cause the loop provided by the conductive member (the housing) to operate as a booster antenna. Furthermore, a loop may be provided by a radiating element of another antenna such as the UHF-band antenna of the radio communication apparatus 310, and the antenna coil or the loop-shaped conductor pattern of any of the antenna modules shown in FIGS. 6 to 8 may be magnetically coupled with the loop provided by the radiating element to cause the loop provided by the radiating element to operate as a booster antenna.

Furthermore, any of the antenna modules shown in FIGS. 6 to 8 may be mounted on an information storage medium, such as an SD card (registered trademark), a SIM card (registered trademark), or the like.

Finally, the description of the preferred embodiments is illustrative in all respects and not limiting, and modifications and changes may be made as appropriate. For example, the components included in different preferred embodiments may be partially replaced or combined with one another. The scope of the present invention is determined by the claims, not by the preferred embodiments described above. Furthermore, all changes that come within the meaning and range of equivalents of the claims are intended to be embraced in the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
    an antenna coil including a first end and a second end;
    an IC including at least a first terminal and a second terminal; and
    a plurality of external terminals; wherein
    the first end of the antenna coil is electrically connected to a first external terminal of the plurality of external terminals;
    the first terminal of the IC is electrically connected to a second external terminal of the plurality of external terminals;
    the second end of the antenna coil and the second terminal of the IC are electrically connected to each other;
    the second end of the antenna coil is electrically connected to a third external terminal of the plurality of external terminals;
    when the antenna device is not electrically connected to an external connection member, no closed loop is defined by the antenna coil and the IC such that even when a magnetic flux links to the antenna coil, a current does not flow; and
    when the antenna device is electrically connected to the external connection member, the plurality of external terminals are electrically connected to the external connection member, or the plurality of external terminals are electrically connected to a conductor pattern provided in the external connection member, to define a closed loop including the antenna coil and the IC and the external connection member partially defines the closed loop.

2. The antenna device according to claim 1, wherein the external connection member is a circuit board.

3. The antenna device according to claim 1, wherein
    the first end of the antenna coil is electrically connected to the first external terminal of the plurality of external terminals;
    the first terminal of the IC is electrically connected to the second external terminal of the plurality of external terminals;
    the second end of the antenna coil is electrically connected to the third external terminal of the plurality of external terminals; and
    the second terminal of the IC is electrically connected to a fourth external terminal of the plurality of external terminals.

4. The antenna device according to claim 3, wherein the IC includes a third terminal electrically connected to a fifth external terminal of the plurality of external terminals.

5. The antenna device according to claim 1, further comprising a capacitor electrically connected between the first terminal and the second terminal of the IC or electrically connected in series with the first terminal or the second terminal of the IC.

6. The antenna device according to claim 5, wherein the capacitor includes a capacitance pattern included in a multilayer body.

7. The antenna device according to claim 1, wherein the antenna coil includes a conductor pattern included in a multilayer body, and the multilayer body includes a magnetic material within at least a winding range of the antenna coil.

8. The antenna device according to claim 7, wherein the IC is located on a surface of the multilayer body.

9. The antenna device according to claim 7, wherein the IC is located within the multilayer body.

10. The antenna device according to claim 7, wherein the multilayer body includes a plurality of ferrite sheets.

11. The antenna device according to claim 7, wherein the multilayer body includes a plurality of resin sheets.

12. An antenna module comprising:
the antenna device according to claim 1; and
the external connection member to which the antenna device is electrically connected; wherein
the external connection member includes a circuit defining the closed loop including the antenna coil and the IC.

13. The antenna module according to claim 12, wherein the external connection member is a circuit board.

14. The antenna module according to claim 12, wherein the circuit of the closed loop is a loop-shaped conductor pattern.

15. The antenna module according to claim 12, wherein the circuit of the closed loop includes a resonant frequency adjusting impedance element.

16. The antenna module according to claim 15, wherein the resonant frequency adjusting impedance element is a chip capacitor or a chip inductor.

17. The antenna module according to claim 12, further comprising a resistor or a capacitor electrically connected to one of the plurality of external terminals.

18. The antenna module according to claim 17, wherein:
the external connection member includes an external circuit; and
the IC is electrically connected to the external circuit by the one of the plurality of external terminals and the resistor or the capacitor.

19. A communication terminal apparatus comprising the antenna device according to claim 1.

20. A communication terminal apparatus comprising the antenna module according to claim 12.

* * * * *